United States Patent
Kisters

(10) Patent No.: US 8,839,380 B2
(45) Date of Patent: Sep. 16, 2014

(54) METHOD FOR THE TEMPORARY PERSONALIZATION OF A COMMUNICATION DEVICE

(76) Inventor: Friedrich Kisters, Kreuzlingen (CH)

( * ) Notice: Subject to any disclaimer, the term of this patent is extended or adjusted under 35 U.S.C. 154(b) by 434 days.

(21) Appl. No.: 12/933,715

(22) PCT Filed: Mar. 20, 2009

(86) PCT No.: PCT/EP2009/002069
§ 371 (c)(1),
(2), (4) Date: Dec. 17, 2010

(87) PCT Pub. No.: WO2009/115339
PCT Pub. Date: Sep. 24, 2009

(65) Prior Publication Data
US 2011/0107405 A1    May 5, 2011

(30) Foreign Application Priority Data

Mar. 21, 2008 (AT) .................................. A 451/2008

(51) Int. Cl.
| | |
|---|---|
| G06F 21/00 | (2013.01) |
| G06F 21/32 | (2013.01) |
| H04L 29/06 | (2006.01) |
| G07C 9/00 | (2006.01) |

(52) U.S. Cl.
CPC ............... H04L 63/08 (2013.01); G06F 21/32 (2013.01); G07C 9/00087 (2013.01)
USPC ................ 726/5; 726/28; 713/186; 455/410; 455/411

(58) Field of Classification Search
USPC ............................................................ 726/5
See application file for complete search history.

(56) References Cited

U.S. PATENT DOCUMENTS

| 5,996,077 A * | 11/1999 | Williams ......................... 726/12 |
| 6,310,966 B1 * | 10/2001 | Dulude et al. ................ 382/115 |
| 6,703,918 B1 | 3/2004 | Kita |
| 2002/0060243 A1 | 5/2002 | Janiak et al. |
| 2003/0115154 A1 * | 6/2003 | Anderson et al. ............... 705/73 |

(Continued)

FOREIGN PATENT DOCUMENTS

| EP | 1 742 450 | 1/2007 |
| WO | WO 2006/018248 | 2/2006 |
| WO | WO 2006/019396 | 2/2006 |

OTHER PUBLICATIONS

Kahn et al., "Chaotic hash-based fingerprint biometric remote user authentication scheme on mobile devices", 2008, pp. 519-524.*

*Primary Examiner* — Mohammad L Rahman
*Assistant Examiner* — Thaddeus Plecha
(74) *Attorney, Agent, or Firm* — Pearl Cohen Zedek Latzer Baratz LLP

(57) ABSTRACT

The invention relates to a method for the temporary personalization of a communication device (1). After producing a communication connection (4) between the communication device (1) and an authentication device (2), an authentication request (6) is transmitted from the authentication device (2) to the communication device (1). A unique feature (7) of the user is then acquired and transmitted to the authentication device (2) by acquisition means of the communication device (1), where it is compared to a stored reference feature (30). Upon correspondence, a user identification (10) is transmitted to the communication device (1). The invention further relates to a communication device and an authentication device which are implemented to carry out the method.

8 Claims, 4 Drawing Sheets

(56) References Cited

U.S. PATENT DOCUMENTS

| | | | |
|---|---|---|---|
| 2004/0034783 A1* | 2/2004 | Fedronic et al. | 713/186 |
| 2004/0083297 A1* | 4/2004 | Gazzetta et al. | 709/229 |
| 2004/0250085 A1 | 12/2004 | Tattan et al. | |
| 2006/0013446 A1 | 1/2006 | Stephens | |
| 2007/0092112 A1* | 4/2007 | Awatsu et al. | 382/115 |
| 2008/0126284 A1* | 5/2008 | Forbes et al. | 706/46 |
| 2009/0163175 A1* | 6/2009 | Shi et al. | 455/411 |
| 2009/0234764 A1* | 9/2009 | Friesen | 705/35 |
| 2010/0177663 A1* | 7/2010 | Johansson et al. | 370/254 |

\* cited by examiner

METHOD FOR THE TEMPORARY PERSONALIZATION OF A COMMUNICATION DEVICE

This application is a U.S. national stage of PCT/EP2009/002069 filed on Mar. 20, 2009 which claims priority to and the benefit of Austrian Application No. A 451/2008 filed on Mar. 21, 2008, the contents of which are incorporated herein by reference.

The invention pertains to a method for the temporary personalization of a communications device. The invention also pertains to a communications device and to an authentication device.

In the case of appliances or devices which are to be operated or used remotely by a central administration or control, the person skilled in the art always encounters the problem of having to establish the access authorization clearly. In particular, it is often required that access to, or use of, a communications device be granted only to a specific user or group of users. In the case of an appliance or device designed to be assigned permanently to a user after authentication has occurred, it is possible, for example, for this assignment to be accomplished by means of a unique key, this key being known only to the authenticated user. The key is issued to the user and must be shown upon startup or use of the device; this can be done, for example, by a process of local authentication. The problem here is that the user must always carry a key feature with him, wherein in particular there is the danger that this key feature can be stolen and then used without authorization by a third party.

In the area of mobile voice communications devices, several possibilities are known for checking or guaranteeing the authenticity of the user before the communications device is used.

For example, US 2002/0060243 A1 discloses a biometric authentication device for use with a telecommunications device such as, for example, a mobile telephone. The biometric authentication device comprises an acquisition means for recording a fingerprint and also a reading device for a data card, wherein reference patterns for permitted fingerprint patterns of a user are stored on the data card. For the biometric authentication of the user, a fingerprint is acquired and compared with the reference patterns stored on the card, and then the action requiring authentication is carried out.

A mobile communications device is also disclosed in WO 2006/019396 A1, which makes biometric identification possible in real time. By means of a biometric sensor, biometric data of people encountered at social or business gatherings are acquired discreetly and unnoticeably so that these persons can be identified in real time and so that the personal characteristics or personal data can be called up from a contact database. In cases where the same data result in several different possible identifications, contact information is produced on a display unit or some other output device of the communications device to assist the user in selecting the correct identity of the recorded person.

WO 2006/018248 A2 also discloses a mobile, portable telephone device, which acquires biometric data of a user and by means of a comparator (unit) compares these data with the biometric reference data of the user stored in a memory unit.

EP 1 742 450 A2 discloses a mobile communications device comprising a biometric identification device, wherein a predetermined personal identification number is encrypted on the basis of the acquired biometric features.

All of the known devices suffer in particular from the disadvantage that, before the communications device can be used for the first time, a person-specific identification feature must be present in it. In particular, this is stored, for example, in a memory unit, or is supplied to the communications device from a data storage device. This requirement of personalization prior to use makes it necessary to present or submit the communications device to an authentication site or to a communications service provider so that it can be personalized. As a result of this personalization, the communications device is then restricted to a specific user or to a defined number of possible users. The addition of another authorized user usually requires that another set of unique personal identification features be stored in the communications device. In particular, because of the conventional way in which communications devices are authenticated or personalized, such devices are usually assigned to only a single user, wherein in certain cases the user must be authenticated to the communications device again for use of the device. Authentication is thus tied to the communications device; a freely elective change and thus a freely elective personalization of a communications device cannot be achieved with the known methods and devices.

The goal of the invention is now to create a method for making it possible for an unpersonalized communications device to be at least temporarily assigned to a uniquely identified and authenticated user. The method is to be designed in such a way that the user does not have to carry along any additional devices or equipment to identify or to authenticate himself correctly. In particular, it is the goal of the invention to make it possible for the user to identify and authenticate himself by means of his own features and/or features known to the user. The goal of the invention is also to create a communications device and an authentication device, wherein the communications device can be assigned temporarily to a uniquely identified and authenticated user and wherein this authentication of the user and the personalization are carried out by the authentication device.

The goal of the invention is achieved by the steps of the method as stated in the main claim presented below.

A communications device as used in the inventive method is not personalized; it is therefore available to any user, wherein the communications device can be used as intended only after it has been personalized. A first step of the method for personalizing a communications device consists in establishing a communications link between the communications device and the authentication device. In most cases, the communications device is not present in the same place as the authentication device; therefore, the communications link is preferably established by means of a wireless route or means of communication, wherein wired communications routes are also possible. The essential point is that, to establish the communications link, it is not necessary to have personal or user-specific information, i.e., the communications route is independent of the personalization.

In next step, the authentication device sends an authentication request to the communications device. The communications device can, for example, be designed for a specific service, but it is also possible for the communications device to provide or to mediate a number of different services. Because the authentication device can be used for a plurality of communications devices, it is also possible, for example, for a service ID to be transmitted when the communications link is being established. The authentication device can now identify the communications device on the basis of this service ID and then transmit an appropriately parameterized authentication request to it. Thus it can be guaranteed that a large number of different communications devices can be addressed or administered by the same authentication device. The authentication request can, for example, comprise information concerning the unique feature or unique features of the user which are to be acquired in the next step of the method.

The communications device therefore comprises acquisition means, which can be used to acquire a unique feature of the user, wherein, in certain cases, the control or selection of the features to be acquired takes place on the basis of the parameterized authentication request.

In the next steps of the method, the acquired feature of the user is transmitted to the authentication device and compared there with a stored reference feature. If the comparison results successfully in agreement, a user ID is transmitted to the mobile communications device. As a result of the transmission of this user ID, a universal communications device—and in particular a communications device which is not functioning in the intended manner—is transformed into a personalized communications device, which can be used by the identified and authorized user in the manner intended. The special advantage of the inventive method is to be found in the fact that the user can use the communications device only through the acquisition of a personal feature of that user. In particular, it is not necessary for the user to carry along with him or to present a device for storing some type of identification code. These types of devices are always subject to the danger of misuse, and there is always the possibility that they can be lost. Carrying and presenting such devices is also associated with considerable effort in most cases.

As the unique user feature to be acquired, it is possible to select from the group comprising biometric features, alphanumeric codes, and personal behavior patterns. Biometric features allow a person to be identified or authenticated on the basis of unique features which in most cases cannot be forged at all or at best forged only with great difficulty. Examples are fingerprints, the sound of the voice, and the iris of the eye; the person skilled in the art will be familiar with other biometric features. An alphanumeric code can in the simplest case consists of a sequence of numerical symbols, which are given in a certain order—from left to right, for example. It is also possible, however, for an alphanumeric code to be read in other ways, so that, in addition to the user ID, it is also possible to transmit various conditions in encoded form. For example, reading from left to right could characterize the feature in its standard form. If the person in question were now to be under threat, for example, he could read the alphanumeric code from right to left; after the transmission of the code, the authentication device would interpret this as an alarm condition, as a result of which a safety measure, for example, could be initiated on behalf of the person. The user authentication process would appear to be completed successfully, so that the attacker would not notice that an alarm was being triggered in the background.

Another unique user feature which could be acquired is a personal behavior pattern. A person can be characterized and thus identified or authenticated by his reaction to certain scenarios, for example, such as by his reaction to certain questions. For this purpose, a behavior pattern of a person is recorded and analyzed in a preceding step, on the basis of which, for example, an authentication request can be generated, which comprises a sequence of questions, to which the person then responds or reacts in the manner typical of him.

In an elaboration of the invention, to reduce the load on the authentication device caused by the need to conduct repeated authentications, a reference feature is transmitted to the mobile communications device and stored temporarily in it. Because the communications device usually comprises a memory unit, it is possible in an advantageous manner to store the transmitted reference feature in this memory unit. This is not critical with respect to security concerns, because the user has already been correctly identified and authenticated and he has therefore been rightfully assigned the personalized communications device.

Once a unique reference feature has been stored in the communications device, the advantage is offered that it is now possible for the comparison between the acquired unique feature and the stored feature to be made in the communications device without the need for the feature to be transmitted to the authentication device and compared there. The communications device could be locked, for example, after a certain time or after a certain number of uses and allow further use only after a new user authentication. In this case, the claimed embodiment would offer the advantage that the authentication could be conducted locally by the communications device.

According to an elaboration, the communications device periodically acquires a unique feature; this is especially advantageous, because, even after the original identification or authentication of the user, the device can check repeatedly to determine whether or not the user currently using the communications device is the same as the one for whom the communications device was originally personalized. This guarantees that unauthorized use following the theft of the communications device can be reliably prevented.

The periodic acquisition can be conducted at fixed intervals, or it is also possible for a new authentication process to be required prior to certain operations or actions.

In an especially advantageous elaboration, the periodic acquisition can be conducted in such a way that there is no interference with the authorized use of the communications device by the user. For example, voice samples could be analyzed periodically during a long conversation, and the user's reference pattern could be extracted from them.

As another way of reducing the load on the authentication device and/or of simplifying the process of repeated authentication in the communications device, it is advantageous, according to an elaboration, for the acquired feature to be analyzed by a processing unit in the communications device. In certain cases, the acquired feature can be so complex that transmission to the authentication device would be associated with considerable overhead. If the communications device is designed as claimed in such a way that the acquired feature can be analyzed or processed in the device itself, characteristic details of the feature, for example, can be extracted, as a result of which, for example, the quantity of information to be transmitted to the authentication device can be significantly reduced. The processing device can also be designed to analyze by itself the quality of the acquired feature, so that a decision can be made right at this stage whether or not the acquired feature can be validly authenticated or whether, as a result of a defect in the acquisition process, the feature has to be acquired again.

A person can be uniquely identified and authenticated not only by a fingerprint by also by the sound of his voice. According to an elaboration, a sound analysis is conducted as a feature analysis; in particular, a so-called formant analysis is conducted, wherein the essential and unique sound-forming frequencies of a person are determined. These formants depend on the unique voice-forming space of the person and are therefore suitable as a means of identification.

With respect to the security of the authentication, another elaboration offers a very significant advantage. Here the feature is encrypted before it is transmitted to the authentication device. A communications link is always subject to the danger of unauthorized tampering; in particular, it is possible to intercept and eavesdrop on the information being transmitted.

If the acquired or possibly analyzed feature is encrypted before transmission, the danger of unauthorized use is significantly reduced. The encryption can be conducted by, for example, a one-way or public key system, wherein possibly a public or partial key, by which the feature is encrypted, is transmitted along with the authentication request. A one-way system offers the particular advantage that only the result of the encryption is transmitted, and thus, even if the transmission is illegally recorded, it is not possible to determine the original feature. The person skilled in the art will be familiar with many different possible encryption procedures or methods for encrypting information in such a way that decryption is impossible or, if it is possible at all, only by the use of a specific unique key.

According to the invention, it is necessary to establish a communications link between the two components so that the communications device can communicate with the authentication device. According to an elaboration, the communications device is registered with a communications network by means of the user ID, which offers the particular advantage that an existing communications network or one of a plurality of different, parallel existing communications networks can be selected, namely, the network in which the communications device is registered as a valid and approved remote communications station. The communications network can be formed, for example, by a public cellular network, but the communications device could also be registered in a 2 G or 3 G mobile phone network of a certain provider or operator. By means of the user ID, in which, for example, network access codes or network registration codes are also stored, the communications device can be registered with the communications network and therefore can be reached by way of this communications network or can establish communications links over it. In certain cases fees can be charged for the use of the communications network or of the services provided over it, wherein the user ID guarantees that the device is uniquely assigned to a user, which means in turn that the billing data required for charging these fees are also available to the service operator or service provider. As protection against unauthorized use of the communications device, this assignment can be operative for only a limited period of time; that is, upon expiration of a predetermined time, the registration of the communications device with the communications network is canceled. One of the possible uses of the communications device could be to make use of a certain service for a short period of time. If, however, the user does not sign off properly from the accessed service, the registration of the communications device with the communications network could remain in effect and could therefore be misused by a third party, for example. The service provider could specify a length of time after which the registration is canceled and thus unauthorized use is prevented. An unintentionally forgotten or lost or stolen communications device therefore does not represent a significant security risk.

With respect to the acquisition of unique personal features, in certain cases there can be the problem that the acquired user features can be slightly different in their degree of detail or in the degree of agreement between one acquisition and another, and in particular there can be slight differences on comparison between the acquired feature and the reference feature. When comparisons are made between acquired features and stored reference features, therefore, there is the problem that exact agreement is extremely difficult to achieve in most cases, and there is therefore the possibility that the user could be wrongly rejected. Therefore, an elaboration is highly advantageous in which the comparison of the transmitted feature with the stored feature is conducted by the "fuzzy" technique. In contrast to an exact agreement, what is obtained in the case of a fuzzy comparison is essentially a set of probabilities or a probability distribution for the degree of agreement. It is therefore possible to define barriers or ranges within which the agreement actually obtained is established as sufficient for the identification or authentication of the user. It is also possible to specify additional ranges in which, even though a unique identification or authentication is no longer possible with complete certainty, a forgery of the acquired unique feature is nevertheless quite improbable. By the use of such fuzzy comparisons and the division into several agreement ranges, it is basically possible to set up, for example, a so-called risk profile, with which a service provider can determine the possible harm which might occur in the event of a wrongly obtained identification or authentication. Through the use of such a risk profile, it is much more likely that the inventive method according to the present elaboration will be accepted by the user, because even incomplete agreement between the acquired feature and the stored feature will still be recognized and accepted as valid authentication, and the user ID will be transmitted to the communications device, thus personalizing it, in accordance with the user's request.

With respect to the security with which the device is assigned, an elaboration is advantageous in which the user ID stored in the communications device is deactivated or deleted in the event that the agreement between the acquired biometric feature and the stored reference feature is imperfect or absent. To ensure that a communications device remains properly personalized, it is necessary to continue verifying the correct personalization of the device during use. For example, a user feature can be acquired and compared cyclically or periodically with the stored reference feature, wherein this comparison can be conducted both in the communications device and also in the authentication device. Thus both local and remote authentications are possible. If an authentication process of this type fails, it can be assumed that the user of the communications device is no longer the same user who was originally identified and authenticated. By means of this advantageous elaboration, it is now possible to delete the user ID from the communications device, thus canceling the personalization of the communications device, and thus to prevent unauthorized use. The authentication process for checking the correct identity or authenticity of the user, however, must be able to recognize that the communications device is being used properly even if the communications device is being accessed briefly by some other user. For example, the sound of the human voice can be acquired as the unique feature, wherein the user ID should not be deleted in cases where the communications device is being used in an environment in which a plurality of voices of other users is being acquired in addition to that of the authenticated user. It is also conceivable, however, that a communications device might be used repeatedly by a limited group of persons. In this case, a deletion of the user ID leads to an unnecessarily large amount of effort, namely, the effort required for re-authentication. Therefore, an elaboration is advantageous in which the user ID is merely deactivated, that is, in which it remains stored in the communications device and thus is available again quickly. When a new request for personalization is made, the communications device itself can check to see whether this user ID is already stored in memory; if so, it can then perform the authentication correspondingly quickly, in particular without the need to contact the authentication device. After the failure of an authentication request, it is advantageous in any case for the user himself to be able to determine whether his user ID has been deleted or merely deactivated.

A further contribution to the security of the identification and authentication process is provided by an elaboration in which, in the case of a defect in, or the absence of, agreement between the acquired feature and the stored reference feature, a second authentication request is transmitted to the communications device. As a result of interference with the acquisition process, for example, or as a result of external influences during the acquisition of the unique feature, the feature may not be acquired uniquely or completely, as a result of which the following comparison would result in an error, and a legitimate user would therefore be rejected on the basis of the failure of authentication. If this happens frequently, the inventive method can suffer a loss of acceptance. According to this advantageous elaboration, the authentication device transmits a second authentication request to the communications device, wherein the second authentication request specifies that a different unique feature is to be acquired, different, that is, from that of the preceding authentication request. For example, a fingerprint could be acquired in response to the initial authentication request, wherein, possibly because of an injury to the skin or dirt in the area to be acquired, a faulty comparison can be made with the stored reference feature. As claimed, the second authentication request would thus require, for example, the acquisition of an audio feature, as a result of which the corresponding units in the communications device would be activated so that a voice signal could be acquired. It is therefore ensured in an advantageous manner that several possibilities are provided for being able to identify and authenticate a user uniquely.

The communications device can offer, for example, a plurality of different services, wherein the individual services possibly have different security requirements on file. According to an elaboration, the authentication request is conducted according to a hierarchic security profile, which offers the particular advantage that authentication of a different quality can be required for each requested service. For example, for low-priority services in which unauthorized use can cause only limited harm, the input of an alphanumeric code can be sufficient for correct identification and authentication. If, in contrast, the requested service involves, for example, a financial transaction or the startup of a production system, the authentication request can require that both an acquired fingerprint and an acquired audio speech sample must agree with the stored reference feature to a certain degree, especially to a high degree.

The goal of the invention is also achieved by a communications device in which a user ID is stored at least temporarily in memory. Known communications devices are usually permanently assigned to a communications network, because especially the user ID and possibly essential network IDs are permanently integrated into the communications device and these devices cannot be put into operation without such user ID. The special advantage of the inventive communications device is now to be found in the fact that it is available in a completely unpersonalized state with no assignment to any communications network and that it is enabled, i.e., personalized, only by temporary assignment, i.e., by the storing of the unique user ID in the memory unit for a specific service or a specific application. An inventive communications device can now be made freely available to anyone, wherein each person can personalize this communications device for himself by initiating an authentication request and in this way arrange for the selection of various services.

For the unique identification and authentication of a person, it is highly advantageous, according to an elaboration, for a biometric detection device to be present, which is formed by a group comprising fingerprint scanner, speech analysis module, and image acquisition unit. By means of biometric data, a person can be identified and authenticated with a very high decree of certainty, because these biometric features are unique to each person. This elaboration is advantageous especially because no additional device which the user must carry along with him is needed to personalize the communications device; on the contrary, identification and authentication are possible on the basis of the user's own unique features, wherein it is almost completely impossible to forge these features. In addition to the examples given here, the person skilled in the art will be familiar with other biometric features, which are also covered by the claims.

Because, in certain cases, user authentication is to be conducted on site, that is, by the communications device itself, an embodiment is advantageous in which the biometric detection unit comprises an analysis and evaluation module. This offers the advantage that there is no need to transmit the detected features to an authentication device, which reduces in particular the quantity of information to be transmitted and thus reduces the danger of any possible interference with the transmitted information. The communications device itself can also conduct repeated authentications without the need for the remote authentication device.

With respect to the widest possible use of the communications device, an elaboration is advantageous in which the communications interface is formed out of the group comprising radio interface, optical interface, and acoustic interface. This plurality of different communications interfaces allows the communications device to be connected to a plurality of different communications networks by means of a plurality of different wireless communications interfaces, wherein, of course, wired communications interfaces are also included. Because the inventive communications device is used preferably for the accessing the services of a remote service provider, this elaboration offers the decisive advantage that a plurality of different communications networks can be used to connect the communications device to the remote communications station of the service provider.

With respect to an embodiment of the communications device, an elaboration is advantageous in which the user ID comprises a unique network ID of a mobile communications provider. These network IDs are known from the area of 2 G and 3 G mobile telephony and make it possible for a communications device to be registered with a communications network of a service provider. In the case of the known communications devices, this network ID was almost always integrated into the device without possibility of change, especially together with the user ID, so that one of the known communications devices would function for only one network operator and especially for only one user. The advantage of the claimed elaboration is that, after the user has been identified and authenticated, the network ID is also stored together with the user ID in the memory of the communications device, which makes it possible for the device to be assigned uniquely to a communications network.

With respect to local verification of the unique feature without the need for remote authentication, an elaboration is advantageous in which the user ID comprises a reference value of a unique feature. Because the user ID is stored only after successful identification and authentication, the storing of a reference value does not represent a security problem, because at this point the communications device has already been securely personalized. This embodiment, however, offers the special advantage that the authenticity of the user can be verified by the communications device itself.

With respect to possible areas of application of the inventive communications device, an elaboration is especially advantageous in which a reader for data storage devices is connected to the control unit. By means of this reader for data storage devices, access to a plurality of different storage media is made possible, preferably those which are designed for or used for the storage of personal user data and access IDs. For example, the data storage device reader can be used to access personalized access cards or identification modules. A non-exhaustive list of examples of such units includes the chip cards or smart cards of service companies or of financial service providers or financial institutions, healthcare ID cards, and any type of customer or membership card.

Known communications devices such as mobile phones comprise user-independent signal processing and communications handling units, which are personalized by presentation or provision of a personalized subscriber ID module and thus rendered functional. With the claimed embodiment, it is now possible to create a communications device which, through a personalized subscriber ID module which can be connected to any desired data storage device reader, to personalize the communications device permanently for a specific user. As a result of the inventive embodiment, it is now possible in addition to suspend this permanent personalization temporarily and to replace it with a user ID which makes it possible for some other identified and authenticated user to use the communications device temporarily. It is therefore ensured in particular in that user-relevant data such as the fees charged for the service being accessed can be assigned uniquely to the user in question. This subscriber ID module can be formed, for example, by a SIM card known from mobile telephony.

After the user has been successfully identified and authenticated, the inventive communications device can also make it possible for the user to use other devices in the near vicinity of the communications device, wherein the communications device regulates the process of authenticating the user to the additional device. It is therefore advantageous in particular for a close-range communications device to be connected to the control unit, wherein this close-range device can be formed by, for example, a wireless communications link such as Blue-Tooth, ZigBee, or an infrared connection (IrDA). Because the communications device is personalized, i.e., because in particular the identity of the user has therefore been uniquely established, it is possible via these close-range communications devices to transmit this personalization to other devices in the near vicinity also, as a result of which the user can access these devices. For example, it can thus be made possible for the user to access a payment system, wherein the data relevant to the person are transmitted by the close-range communications device from the personalized communications device to the payment device. This offers the advantage that there is no need for a user identification process to be carried out in the nearby device such as the payment device; this is handled by the personalized communications device for the duration of the transaction. In an elaboration, however, it is also possible that some other known wireless or wired communications means such as USB, TCP/IP, GSM can handle communications with the nearby device, wherein level and transmission protocol converters can be installed in the communications route if desired.

For the operation of the communications device and especially for the interaction with it, an elaboration is advantageous in which the man-machine interface comprises a display means, a data input means, and an audio input and output device. Such a man-machine interface greatly simplifies the procedures for acquiring a unique user feature, some of which can be highly complex; in particular, for example, useful instructions can be shown to the user on the display means.

The invention is also achieved by an authentication device, in which a plurality of user profiles is stored in the data memory unit and in which a unique reference feature is assigned to the user profile. If each user profile comprises at least one unique user reference feature, a user can be assigned uniquely to a user profile and thus to a large amount of person-specific data stored in the user profile. It is preferable for several unique reference features to be assigned to each user profile, so that, when an authentication request is received, a plurality of different personal features can be acquired and compared, which significantly increases in particular the security and reliability of the personalization. Because a communications device to be personalized is usually intended to be connected to a communications network so that communication can take place, according to an elaboration a unique subscriber ID is stored in the user profile. By means of this subscriber ID, it becomes possible to access a communications network, wherein access can also be gained to services which are offered over this communications network. If desired, a plurality of unique subscriber IDs can be assigned to each user profile, as a result of which it is possible to select the service provider best suited to provide the requested service. Thus it can be decided in each individual case which service provider is to be used for which service, wherein the communications device is then personalized by means of the subscriber ID of the user profile applicable in that individual case.

To reach and use a plurality of different services, it can be necessary for the user to be identified accurately in different ways depending on the authentication request. For example, for low-priority services, entering an alphanumeric code may be sufficient, whereas, for highly sensitive services, it may be necessary to enter multiple biometric IDs. An elaboration in which a hierarchic reference model of unique features is stored in the user profile is therefore advantageous. On the basis of this hierarchic reference model, the unique user features which must be acquired for specific services or classes of services can be uniquely established, so that personalization can be carried out and the service accessed. It is also possible, however, to store in the hierarchic reference model the further procedures which must be carried out in the event that the agreement between an acquired feature and the stored reference feature is imperfect or in the event that there is no agreement at all. For example, it is conceivable that, in the case of imperfect agreement, the next-higher feature, i.e., next-higher in terms of security, will have to be acquired in order to compensate for the imperfect agreement. It can occur as a result of unfavorable circumstances, for example, that a fingerprint cannot be detected adequately and that the comparison with a stored reference feature therefore fails. According to the invention, an authentication request higher up in the hierarchy would then be initiated, which might, for example, comprise the acquisition of a speech pattern. If the completed comparison is successful, the problem with the first acquisition is resolved and personalization can then be conducted without qualm. In particular, it is therefore possible to realize so-called multi-factor authentication, in which a person is identified and authenticated on the basis of a combination of several unique features. So far, a very rigid authentication procedure has been known, according to which a permanently predetermined authentication process had to be successfully completed. With the inventive elaboration, it is now possible without loss of reliability to adapt the authentication of persons much more flexibly to the security requirements.

For security reasons, it is possible, for example, that some service providers such as communications network operators do not release user-relevant or network-relevant data. In and advantageous elaboration, the authentication device therefore comprises an interface to a service provider over which access to user-relevant or network-relevant data is possible without trespassing on security areas or data privacy areas of the service provider. This embodiment offers the very special additional advantage that a service provider can use this interface with the authentication device to check the authenticity of the communications device directly. For example, a correctly personalized communications device could have been manipulated in such a way as to make the personalization permanent. When the communications device asks to be registered, the service provider can communicate with the authentication device and check to see whether or not the personalization of the communications device is still valid.

According to a further elaboration, both the authentication device and the service provider could use an external certification entity to authorize a user. This entity has a plurality of user features on file and, when it receives a request to authorize, confirms that the requested user data agree with the stored data. The advantage of this type of certification entity includes the fact that this entity usually meets a very high security standard and can therefore be categorized as highly trustworthy.

Of significant advantage is an elaboration in which the sequence control unit comprises a cryptography module, for in this way it is possible to realize a significant increase in the security of the personalization, because it is not necessary to transmit the unique user features which have been acquired and/or because the transmission can be protected. If acquired unique features are transmitted without encryption, there is always the danger that this transmission can be intercepted and possibly used for illegal purposes. With a cryptography module, it is now possible to transmit features in encrypted form and to decrypt them again uniquely in the authentication device. It is also possible to transmit a key to the communications device, by means of which this device encrypts an acquired feature and transmits only the result to the authentication device. The reference feature is also encrypted with the key in the authentication device, and then only the results of the two individual encryptions are compared. It is possible in this case to use key combinations which make it impossible to deduce the original feature from the result.

So that the invention can be better understood, it is explained in greater detail below on the basis of the following figures:

Each of these figures shows highly schematic, simplified diagrams:

By way of introduction, it should be kept in mind that, in the various embodiments described below, the same parts are identified by the same reference symbols or component designations, where the disclosures contained anywhere in the description can be carried over by analogy to the same parts bearing the same reference symbols or component designations. The positional indications used in the description, such as top, bottom, side, etc., furthermore, pertain to the figure being described and illustrated then and there, and when there is a change in position they can also can be carried over by analogy to the new position. Individual features or feature combinations taken from the various exemplary embodiments illustrated and described here can also represent in themselves independent inventive solutions or solutions in accordance with the invention.

All of the data on value ranges in the concrete description are to be understood in such a way that they comprise any and all partial ranges, e.g., the statement "1-10" is to be understood in such a way that all partial ranges proceeding up from the lower limit of 1 and down from the upper limit of 10 are also included, that is, all partial ranges beginning with a lower limit of 1 or greater and ending at an upper limit of 10 or less, e.g., 1-1.7 or 3.2-8.1 or 5.5-10.

Figure 1:
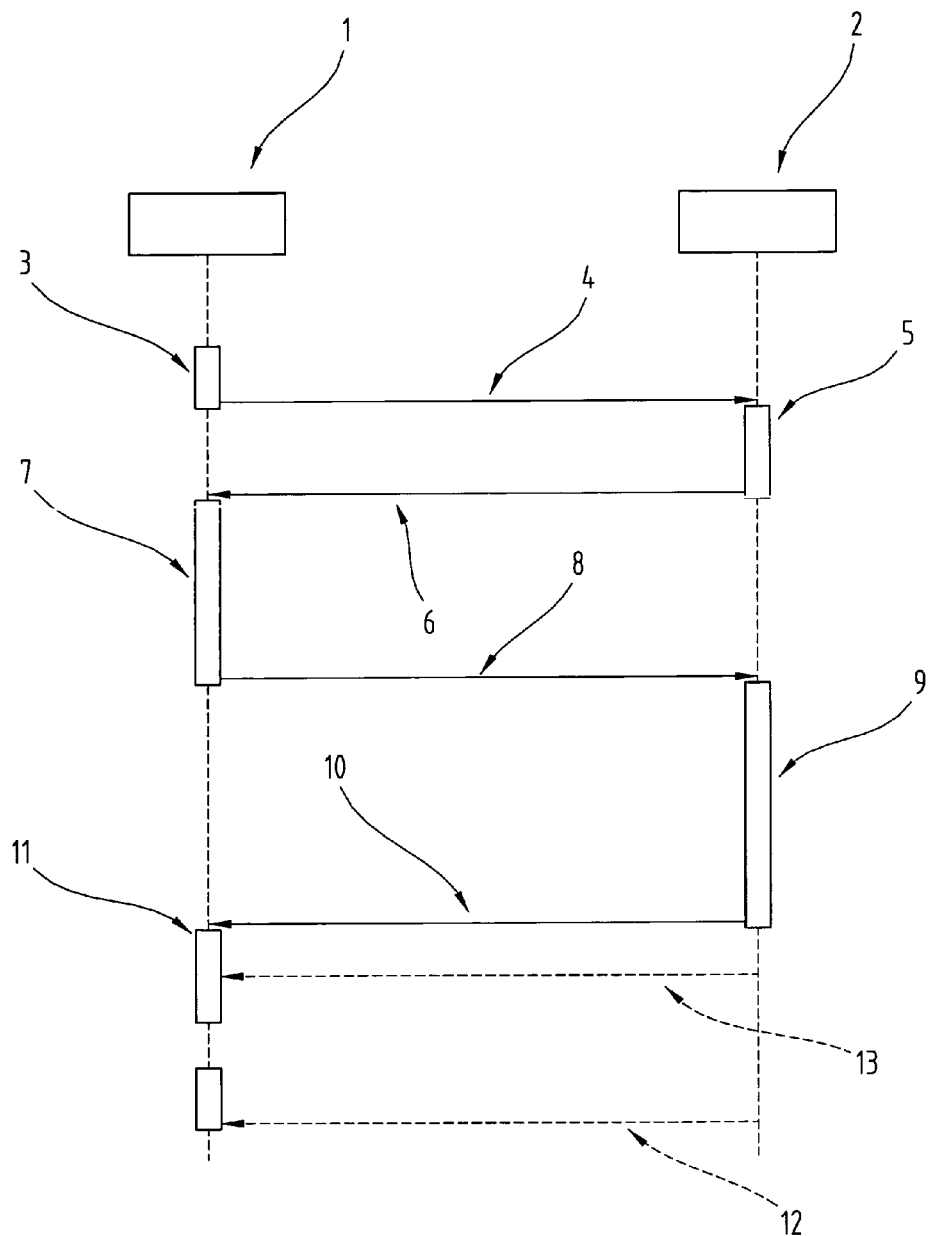
FIG. 1 shows a flow chart of the inventive method.

FIG. 1 shows the sequence of the method, i.e. the steps of the method implemented in the communications device 1 and in the authentication device 2. Before the communications device 1 is used for the first time, it is an unpersonalized state and therefore is not assigned to either a communications network or a user. The communications device 1, however, is able to enter into communication with an authentication device 2 over a standardized or universal communications route. When a user would like to personalize a communications device for himself, he initiates a personalization request 3 in the communications device. The job of this personalization request is to bring the communications device into a defined state so that the inventive method can be executed and, if the user is authenticated successfully, to take over the personalization task. This means in particular that, in a first step 4, a communications link is established between the communications device 1 and the authentication device 2. The personalization request 3 can comprise, for example, an identification step, in which the user must state a device ID, for example, so that the communications device 1 can be put into operation. An identification step of this type could consist, for example, in that the user provides a speech feature and/or a personal ID number, which is transmitted by the communications device over a standardized communications channel to a verification device, wherein the verification device, upon agreement with a stored reference pattern, releases the communications device for the performance of the authentication. The verification device can be integrated if desired into the authentication device.

After the personalization request has been received in the authentication device 2 over the established connections link 4, the type of communications device 1 making the request is checked. If desired, the transmitted personalization request can also comprise a so-called service ID. The communications device 1 is designed in principle to offer the user several services and/or to provide access to several services. The checking 5 of the request comprises, for example, the determination of the technical communications capacities or facilities of the communications device 1 and the determination of the feature to be acquired from the person for the purpose of identification or authentication. On the basis of the result of this check, the authentication device 2 transmits 6 a correspondingly parameterized authentication request to the communications device 1. This authentication request comprises at least an instruction to the communications device to acquire a feature of the user. In the case of more highly complex communications devices, the authentication request can also contain the information specifying which feature of the user is to be acquired, wherein the communications device then activates the corresponding acquisition unit. To ensure the security of the transmission between the communications device and the authentication device, a key of an encryption method can also be transmitted along with the authentication request. With this key, the communications device is able to encrypt and transmit the acquired user feature, wherein the encryption can be designed if desired in such a way that it is impossible to derive the original information from the result of the encryption.

In the next step of the process, an acquisition unit in the communications device acquires 7 a unique feature of the user. This feature acquisition can be accomplished, for example, by the entry of an alphanumeric code or by the acquisition of a fingerprint or of voice data. The acquired feature is then transmitted 8 to the authentication device 2, wherein, depending on the technical design of the communications device 1, it is possible for the acquired feature to have been processed in advance. If desired, the feature acquisition 7 can also comprise steps in which the acquired feature data are analyzed or processed or secured against unauthorized use. Acquired personal features can under certain conditions comprise a large volume of data; it is therefore advantageous for the quantity of data to be reduced in the communications device itself, so that only the essential characteristics or the result of a security procedure need to be transmitted 8 to the authentication device 2. These advantageous elaborations reduce the volume of data to be transmitted, and at the same time they secure the transmission against authorized eavesdropping on the transmission.

The acquired or possibly already processed user feature is compared 9 in the authentication device 2 with a stored feature. Preferably a plurality of reference features of various users are stored in the authentication device 2. The feature acquired by the communications device 1 and transmitted 8 to the authentication device 2 is now compared with the stored features, the goal being to find the greatest possible agreement between the acquired feature and the stored one. If agreement is found, a user ID is transmitted 10 to the communications device 1. Before the user ID is transmitted, it is parameterized in the authentication device 2; in particular, a network ID, for example, and network access data are added to it; in certain cases, a reference feature can also be stored in the user ID. As a result of the transmission 10 of the user ID, the communications device 1 is assigned uniquely to an identified and authenticated user. In particular, from this time on, all rights and duties of the user pertaining to the personalized communications device are transferred to him and activated. For example, the communications device can be a device for mobile voice communication, wherein, after personalization has been completed, the fees charged for use of the communications device 1 are assigned, and thus the payment of the fees incurred are handled via the billing accounts assigned to the user.

The personalization 11 can last for an unlimited time, but a time-limited personalization is also possible. For example, the personalization could be cancelled automatically by the communications device 1 after the expiration of a certain period of time or after a fixed number of completed service requests has been reached, wherein the transmitted user ID 10 is deleted from the communications device 1. It is also possible, however, for the authentication device 2 to cancel 12 the personalization. To secure the unique assignment of a user to a communications device, the authentication device 2 can, in certain cases, transmit a request for re-authentication 13 to the communications device 1. This re-authentication request can itself be repeated at regular intervals, for example, or if, for example, a request for service is transmitted after a long period of inactivity of the communications device 1. To ensure that the person in possession of the communications device or the person accessing it is in fact the person originally identified and authenticated, the correct personal assignment can be verified by means of the new identification request 13.

Figure 2:
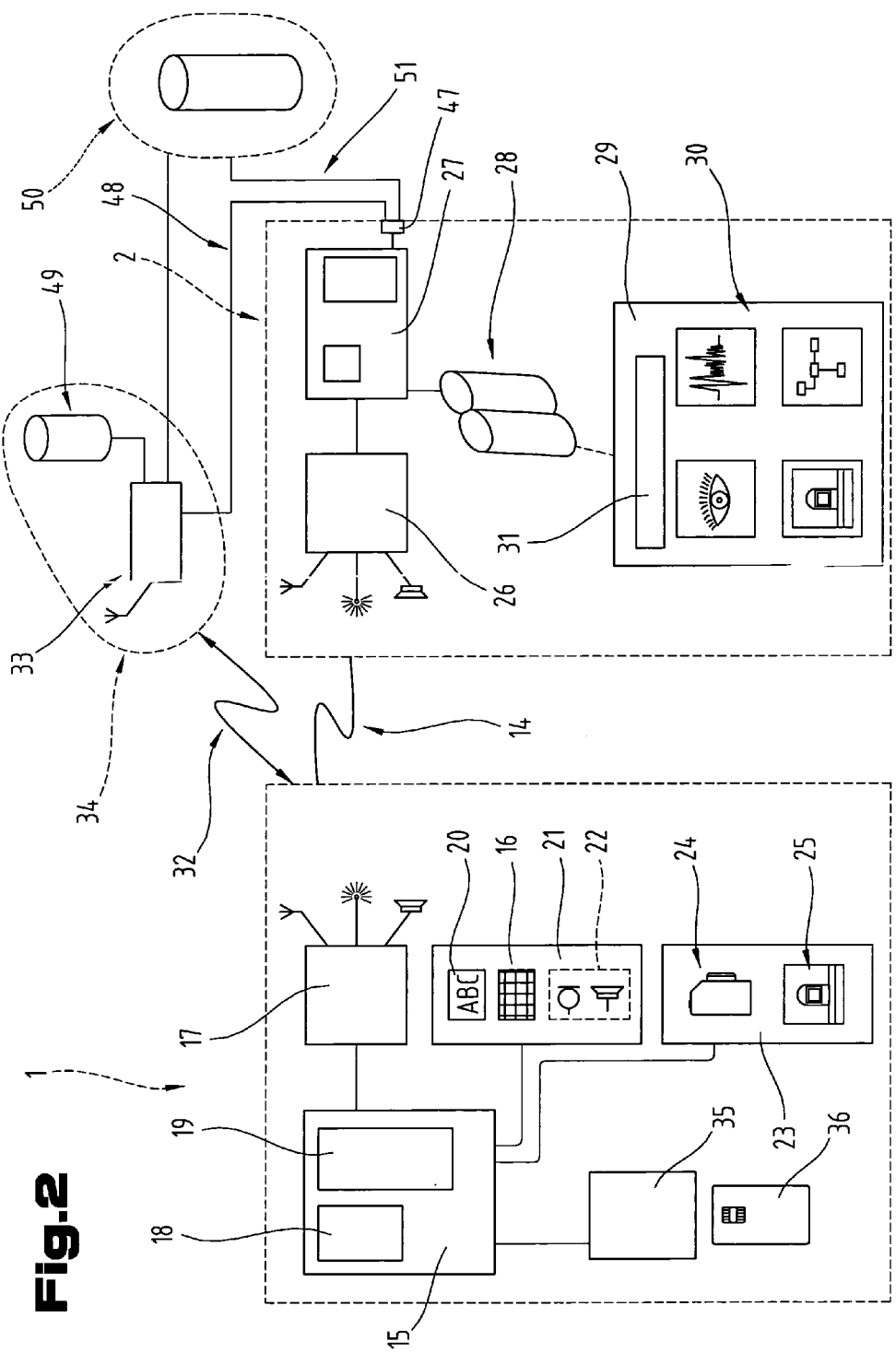
FIG. 2 shows a communications device and an authentication device which implement the inventive method.

FIG. 2 shows a schematic diagram of the communications device 1 and the authentication device 2, which are communicating with each other over a communications link 14. The communications device 1 comprises at least a control unit 15, a man-machine interface (MMI) 16, and a communications interface 17. The control unit 15 also comprises a processor 18 and a read-write memory unit 19. According to an elaboration, the memory could be designed at least in part as nonvolatile memory, so that the stored user ID will still be available after the communications device is turned on again, there thus being no the need for another authentication. To facilitate the operation of the communications device or the interaction with requested or provided services, it is preferable to have a man-machine interface 16, which, for example, comprises a display means 20, an alphanumeric input unit 21, and an audio input-output device 22. The acquisition of a unique user feature can now be accomplished, for example, by way of the MMI 16 through the use of, for example, the input device 21 designed as an alphanumeric keyboard or by acquisition of a voice pattern by means of the audio input-output device 22. It is also possible, however, for an additional acquisition means 23 to be present, by means of which, for example, the shape of the face or the iris of the eye can be acquired, this preferably being done by way of an optical image acquisition device 24, or by means of which a fingerprint can be acquired by an appropriate scanner 25.

The communications device can also comprise an analysis module and/or a cryptography module. These elaborations make it possible to process the acquired user features with the goal of reducing the quantity of data to be transmitted to the authentication device 2 or to secure the transmission and/or the acquired user feature against unauthorized manipulation.

The communications interface 17 is designed to establish produce a communications link 14 with a remote corresponding station of the authentication device 2, where preferably a wireless, long-range communications interface is used. The communications interface 17 can be formed, for example, by a means for transmitting and receiving electromagnetic radiation both in the high-frequency range and also in the optical range; a transmitting and receiving device for high-frequency sound transmission is also conceivable. Because the authentication device 2 is preferably intended to communicate with a plurality of communications devices 1, the communications link 14, especially the communications interfaces 17 of the communications device 1, and the communications interface 26 of the authentication device 2 are designed in such a way that it is possible to achieve the greatest possible local distance between the communications device 1 and the authentication device 2. The communications interface 26, like the communications interface 17, is designed so that it is able to establish a communications link 14 between the devices 1, 2. So that the inventive method for the personalization of a communications device and/or for the analysis and comparison of acquired unique user features can be implemented, the authentication device 2 also comprises a sequence control unit 27, which in certain cases can comprise a processor and memory. A plurality of user IDs 29 are preferably stored in a read-write data storage device 28, especially a nonvolatile storage device, where at least one unique reference feature 30 is stored for each user ID.

In the inventive method for personalizing a communications device 1, a unique user feature is acquired by the device and transmitted to the authentication device 2 over the communications link 14. Here, a comparison unit, for example, which is possibly formed by the sequence control unit 27 or is integrated into it, compares this feature with reference features stored in the data storage device 28. If agreement with a stored feature is established, a user ID is issued, wherein user-specific data from the user profile 29, including possibly a subscriber ID 31, are integrated into the user ID or wherein these data are appropriately parameterized. The user ID can in certain cases also comprise a reference feature 30, so that a second authentication or repeated authentications can be conducted in the communications device 1. The parameterized user ID is transmitted to the communications device and stored in its memory 19. By means of this user ID, especially an ID with the parameterized subscriber ID, the control unit 15 or the communications interface 17 can now establish a communications link 32 with a remote communications station 33 of a communications network provider and register the communications device 1 in the communications network 34. As long as the communications device remains personalized, that is, as long as a user ID is stored in its memory, the assignment of the communications link 32 remains preserved, and the fees for providing or using the services are billed by way of the person-specific billing and communications data stored in the user profile 29.

In certain cases, a reader 35 for data storage media can also be present in the communications device 1. This reader is preferably able to communicate with the control unit 15. A personalized subscriber module 36 can be placed in the data storage medium reader 35; this can be done, for example, by inserting the module into the reader. The access data stored on the subscriber ID module are read out, and the communications device is registered in turn with a communications network 34. By the use of this elaboration, the communications device can be registered for a first user, wherein the person-specific registration data are stored on the subscriber ID module 36. At the same time, however, it is possible to suspend this personalization temporarily, so that some other user can be identified and authenticated by way of the authentication device 2, whereupon a user ID is transferred to the communications device and stored in its memory. As a result, the prevailing registration is canceled, and the communications device is personalized temporarily for the second user. In addition to the personalization conducted by way of a subscriber ID module 36, the inventive method also makes it possible in this way for the communications device to be personalized temporarily for some other user.

The figure shows another possible variant of how personal reference data can be accessed. In certain cases, the service provider or operator of the remote communications station 33 may not allow personal data to be stored outside the security area in question. In an advantageous elaboration, therefore, the authentication device 2, especially the sequence control unit 27, could comprise an interface 47, over which a direct communications link 48 with the remote communications station 33 or the service operator can be established. The comparison of the acquired unique feature transmitted to the authentication device 2 then takes place directly in or by the remote communications station 33 through access to the reference data stored in a data storage device 49.

It is also possible for the user to be authenticated by an external certification entity 50. Using the interface 47 and a communications link 51, the authentication device 21 could have the certification entity verify the acquired personal data. Upon successful authentication, a user ID is transmitted to the communications device 1, wherein this device then registers itself with the communications network 34. The remote communications station 33 can now for its own part conduct a counter-check to ensure that the authentication was performed correctly. For this purpose, the remote communications station can also initiate a check at the certification site 50 to guarantee that the user correctly authenticated by the authentication device 2 is also the user whose communications device 1 now wants to register itself with the communications network 34 of the remote communications station 33.

Figure 3:
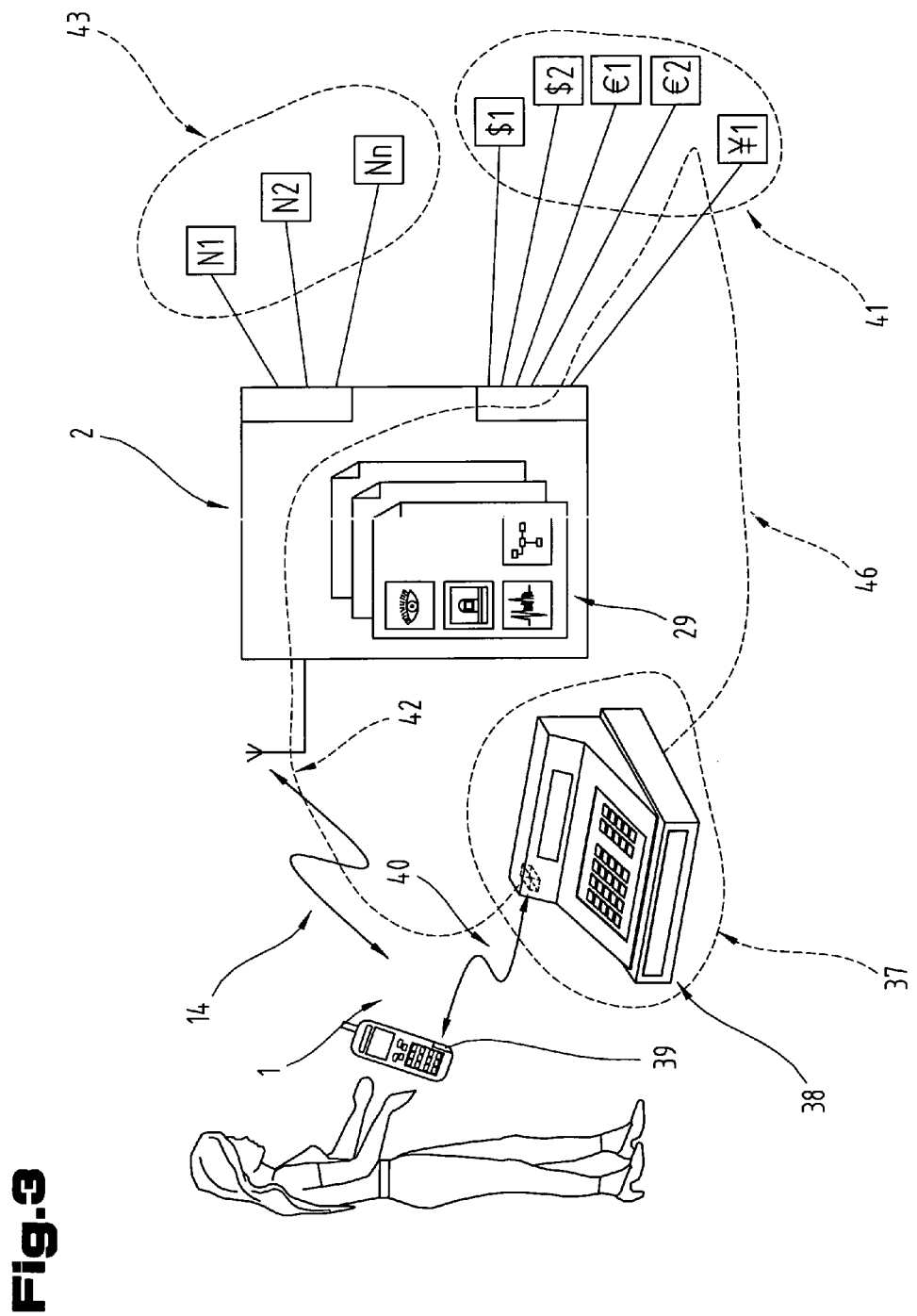
FIG. 3 shows a possible elaboration in which a personalized communications device serves as an approval device.

FIG. 3 shows another possible embodiment, in which the inventive method or the invention communications and the devices can be used. In the case shown here, the personalized communications device 1, operating by way of the authentication device 2, is used at the site of the service provider 37 to initiate or to execute a service and/or to approve the fees charged for that service. When the service is called up or used, it can be necessary, for example, for the user to pay a fee for the service being used, which is paid in certain cases on the basis of his billing information stored in the user profile 29. After accessing a process or service and completing the process, the user could now, for example, initiate a payment process in a fee payment device 38. The communications device 1 comprises, for example, a close-range communications device 39, through which a communications link 40 can be established with the fee payment device 28. For services with low security priority, the process of bringing the personalized communications device into close proximity of the fee payment device 38, i.e., in particular the process of establishing the communications link 40, could be sufficient to execute the charging or payment process. For paying service fees of high security priority, it can be necessary, for example, for the user to initiate a fee payment process with a fee payment service provider 41. For this purpose, the fee payment device 38, for example, can, by way of the communications link 40 and the personalized communications device 1, initiate a service request to a possible provider 41, wherein this provider receives the unique ID of the requesting user by way of the authentication device. The fee payment service provider 41 to which the request has been sent can now, on the basis of the unique identification of the requesting user, instruct that the fee be charged and transmit this payment instruction over a first communication route 42, i.e., the authentication device 2, the communications link 14, and the communications device 1, and then over the communications link 40 to the fee payment device 38. There is also another possible route over which the release for payment can be transmitted; for example, a direct communications link 46 can be established from the fee payment service provider 41 to the fee payment device 38, and the release for payment can be transmitted in this way.

Another embodiment is also possible, however, in which the personalization request of the communications device 1 is evaluated by the authentication device 2 in such a way that the service provider 43 selected is the one who offers the currently requested service at the lowest price. In certain cases, the communications device 1 can also have available a geopositioning device, as a result of which the selection of the lowest-price provider 43 could also take into account location information, as a result of which the user could receive information displayed on the man-machine interface about where in his immediate area the requested service is available at the lowest cost.

Figure 4:
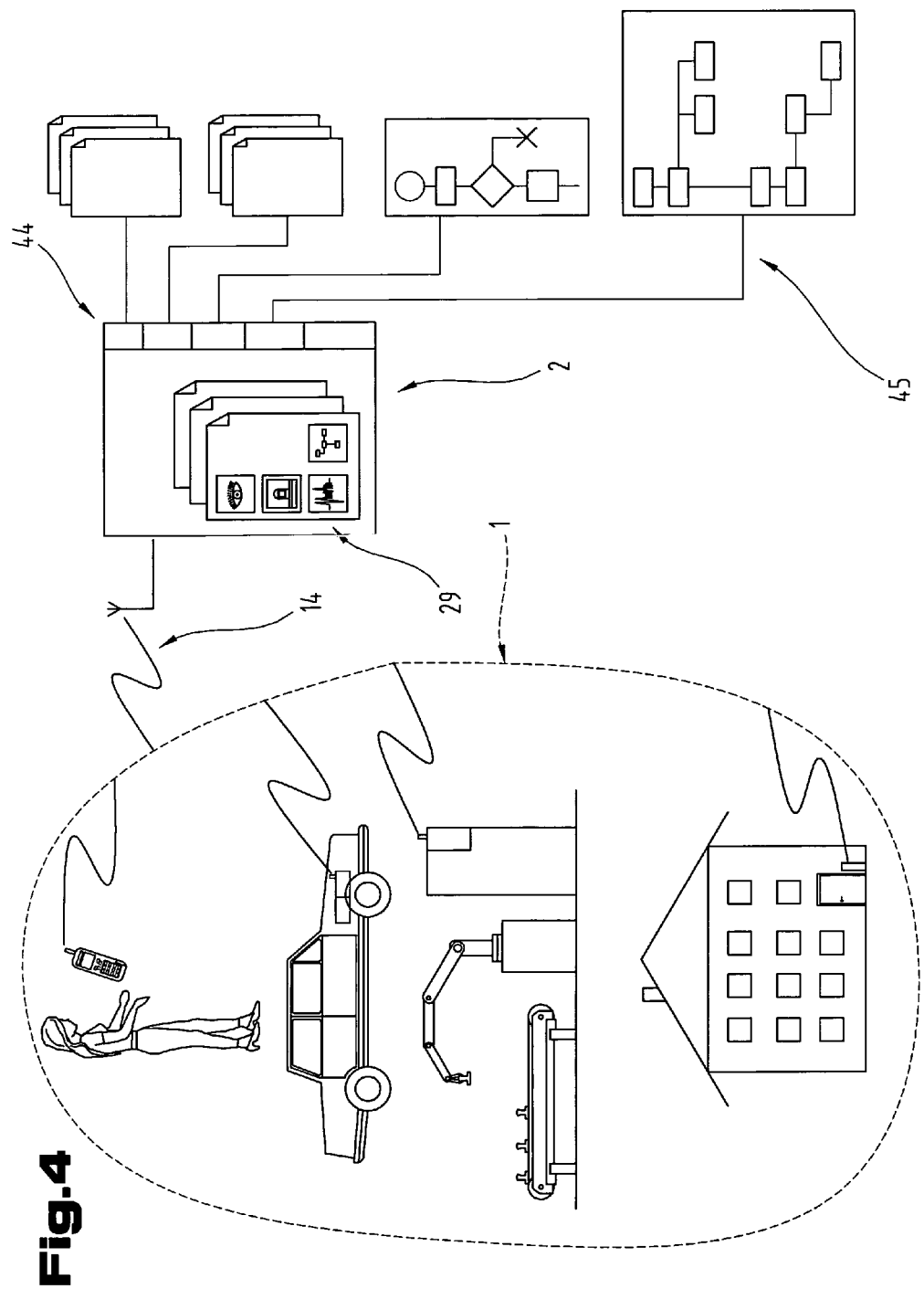
FIG. 4 shows possible further embodiments of the inventive method and its devices.

FIG. 4 shows another possible embodiment in which the inventive method can be used advantageously. A plurality of communications devices 1 are connected over a connections link 14 to the authentication device 2 and conduct the personalization process over it. The communications device can be, for example, a device for mobile communication; in particular, mobile phones and mobile radios are included here.

It is also possible, however, for the communications device to be part of the operational control of a motor vehicle, where the communications device can be connected to the electronic control system of a vehicle and allows the vehicle to be started only after the communications device has been personalized. It would be possible in his way, for example, to operate a fleet of rental cars, in which the starting of the vehicles and the charging for their use would be handled by the inventive method.

It is also possible for the communications device to be part of a control unit of a fabrication or facility, which can be put into operation only after successful identification and authentication of a user. For example, in an embodiment of this type, it is possible for the authority to report on quality assurance matters or to acquire production data to be assigned uniquely to a user along with the personalization. The operator of a facility of this type therefore has the advantageous possibility of being able to assign a production lot accurately to an identified user.

Also conceivable is an embodiment in which the communications device is part of an access security system, such as the security system for a building. A user is allowed to enter the security zone only after he has been correctly identified and authenticated, wherein it is also possible to realize additional entrance scenarios and security areas.

The authentication device 2 communicates over a plurality of interfaces 44 with a plurality of service providers 45. Depending on the area of application of the communications device 1, the service providers can be, for example, communications, data, or news services; the communications device 1 in this case is activated for a service or registered with a network. After successful personalization, it is also possible, however, for the communications device to enable the startup or use of some other device by the authenticated user. Similarly, the personalized communications device can form a kind of key, which makes it possible for the user to move in secured areas or to enter them.

The examples described here are possible embodiments in which the inventive method can be used to allow any communications device over which a service is provided or a service can be accessed or some other device can be activated to be uniquely assigned, at least temporarily, to a user and possibly to charge the user uniquely for the fees incurred for the use of the service. In addition to the examples given here, however, there are also other embodiments which can be conceived in which a unique user assignment is required only occasionally, wherein in particular the possibility should exist of being able to offer the device to a plurality of different users or to make it possible for them to use it.

The exemplary embodiment show possible concrete variants of the method, of the communications device, and of the authentication device, wherein at this point it should be pointed out that the invention is not limited to the concrete variants of the method and of the devices specifically presented here; on the contrary, different combinations of the individual variants with each other are also possible, and this possibility of variation based on the teaching concerning technical actions through concrete invention lies within the ability of the person actively involved in this technical area. Therefore, all conceivable concrete variants which are possible through combinations of individual details of the illustrated and described concrete variants are covered by the scope of protection.

FIGS. 2, 3, and 4 show additional embodiments, which in certain cases can stand on their own, wherein again the same reference symbols or component designations as those used in the preceding figures are used for the same parts. To prevent unnecessary repetition, reference is made to the detailed description of the preceding figures.

For form's sake, it should be pointed out in conclusion that, in some cases, the sequence of steps of the method and the design of the communications device and of the authentication device or their components are not shown to scale or are shown enlarged or reduced in size.

The goal on which the independent inventive solutions are based can be derived from the description.

Above all, the individual embodiments shown in FIGS. 1-4 can form the object of independent, inventive solutions. The inventive goals and solutions in this regard can be derived from the detailed descriptions of these figures.

LIST OF REFERENCE NUMBERS

1 communications device
2 authentication device
3 personalization request
4 establishment of a communications link
5 checking of the request
6 transmission of the authentication request
7 feature acquisition
8 transmission of the acquired feature
9 comparison with the stored feature
10 transmission of the user ID
11 personalization
12 cancellation of the personalization
13 request for re-authentication
14 communications link
15 control unit, processing unit
16 man-machine interface (MMI)
17 communications interface
18 processor
19 memory
20 display means
21 input device
22 audio input/output device
23 acquisition means
24 optical image acquisition device
25 fingerprint scanner
26 communications interface
27 sequence control unit
28 data storage device
29 user profile
30 reference feature
31 subscriber ID
32 communications link
33 remote communications station
34 communications network
35 reader for data storage device
36 subscriber ID module
37 service provider
38 fee payment device
39 close-range communications device
40 communications link
41 fee payment service provider
42 communications route
43 service provider
44 interface
45 service provider
46 communications route
47 interface
48 communications link
49 data storage device
50 certification entity

The invention claimed is:

1. A method for a temporary personalization of a mobile communications device for an individual user to have access to a specific service or a specific application, comprising the steps:
   establishing a communications link between the mobile communications device and an authentication device;
   transmitting an authentication request from the authentication device to the mobile communications device;
   acquiring a first unique feature of the user by an acquisition measure of the mobile communications device;
   transmitting the acquired first unique feature to the authentication device;
   comparing the transmitted first unique feature with a stored reference feature from a plurality of reference features of various users stored in the authentication device; and
   if there is agreement between the transmitted first unique feature and the stored reference feature, the user is identified and authenticated and a unique user ID is transmitted to the mobile communications device, wherein:
   the mobile communications device is a mobile phone;
   the first unique feature comprises at least one of the group comprising a biometric feature, alphanumeric code, and personal behavior pattern;
   the user ID comprises a network ID;
   the mobile communications device is registered with a communications network by means of the unique user ID, thereby registering the communications device as a valid and approved remote communications station in the communications network; and
   after the user has been identified and authenticated, the unique user ID is temporarily stored in a memory unit for the specific service or specific application; and
   if there is no or imperfect agreement between the transmitted first unique feature and the stored reference feature, a request for re-authentication is transmitted to the communications device and a second unique feature with higher security is acquired, wherein security is based on a hierarchic reference model of unique features.

2. The method of claim 1, wherein the reference feature is transmitted to the communications device and temporarily stored.

3. The method of claim 2, wherein the acquired first unique feature is compared with the temporarily stored reference feature.

4. The method of claim 1, wherein the user is identified using unique features acquired periodically in the communications device.

5. The method of claim 1, wherein the acquired first unique feature is analyzed by a processing unit in the communications device.

6. The method of claim 5, wherein the feature analysis involves a sound pattern analysis of speech data.

7. The method of claim 1, wherein the first unique feature is encrypted before transmission to the authentication device.

8. The method of claim 1, wherein the comparison of the transmitted first unique feature with the stored feature is conducted in a fuzzy manner.

* * * * *